United States Patent
Uruno et al.

(10) Patent No.: US 11,209,163 B2
(45) Date of Patent: Dec. 28, 2021

(54) GAS TURBINE COMBUSTOR, MANUFACTURING METHOD FOR GAS TURBINE AND GAS TURBINE COMBUSTOR

(71) Applicant: Mitsubishi Power, Ltd., Yokohama (JP)

(72) Inventors: Tomoki Uruno, Tokyo (JP); Keita Yunoki, Tokyo (JP); Kazuki Abe, Tokyo (JP); Tomohiro Asai, Yokohama (JP); Mitsuhiro Karishuku, Yokohama (JP); Tatsuya Hagita, Yokohama (JP); Shohei Yoshida, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 20 days.

(21) Appl. No.: 16/718,972

(22) Filed: Dec. 18, 2019

(65) Prior Publication Data
US 2020/0200389 A1    Jun. 25, 2020

(30) Foreign Application Priority Data

Dec. 20, 2018    (JP) .............................. JP2018-238046

(51) Int. Cl.
*F23R 3/16*    (2006.01)
*F23R 3/28*    (2006.01)
*F02C 7/18*    (2006.01)

(52) U.S. Cl.
CPC .................. *F23R 3/16* (2013.01); *F02C 7/18* (2013.01); *F23R 3/28* (2013.01); *F05D 2230/60* (2013.01); *F05D 2240/35* (2013.01)

(58) Field of Classification Search
CPC .... F23R 3/002; F23R 3/10; F23R 3/16; F23R 3/28; F23R 3/286; F23R 2900/00012; F23R 2900/00017; F23R 2900/00018
See application file for complete search history.

(56) References Cited

U.S. PATENT DOCUMENTS

2012/0045725 A1* 2/2012 Takiguchi ............... F23R 3/286
431/60
2012/0111012 A1    5/2012 Axelsson et al.
(Continued)

FOREIGN PATENT DOCUMENTS

CN    103459928 A    12/2013
CN    106524222 A    3/2017
(Continued)

OTHER PUBLICATIONS

Chinese-language Office Action issued in Chinese Application No. 201911317471.4 dated Feb. 25, 2021 with English translation (12 pages).

(Continued)

*Primary Examiner* — Scott J Walthour
(74) *Attorney, Agent, or Firm* — Crowell & Moring LLP

(57) ABSTRACT

A gas turbine combustor that mixes fuel with compressed air guided from a compressor to burn the fuel mixed with the compressed air to generate a combustion gas and supplies the generated combustion gas to a turbine is provided with: an inner cylinder forming a combustion chamber thereinside; an outer cylinder that covers the inner cylinder and forms, between the outer cylinder and the inner cylinder, a cylindrical outer peripheral flow path through which the compressed air flows; an end cover closing the end of the outer cylinder on an opposite side from a side the turbine is located; and a turn guide provided at the end on the end cover side of the inner cylinder, protruding from the outer peripheral surface of the inner cylinder toward the outer cylinder and smoothly connected to the inner peripheral surface of the inner cylinder.

9 Claims, 12 Drawing Sheets

(56) References Cited

U.S. PATENT DOCUMENTS

| | | | |
|---|---|---|---|
| 2014/0216051 A1* | 8/2014 | Johnson ................. | F23R 3/045 |
| | | | 60/776 |
| 2017/0074519 A1 | 3/2017 | Abe et al. | |
| 2017/0138598 A1 | 5/2017 | Akiyama et al. | |
| 2018/0112879 A1 | 4/2018 | Miura et al. | |

FOREIGN PATENT DOCUMENTS

| | | |
|---|---|---|
| CN | 107975821 A | 5/2018 |
| EP | 2 687 682 A2 | 1/2014 |
| JP | 2003-148734 A | 5/2003 |
| JP | 2017-53276 A | 3/2017 |

OTHER PUBLICATIONS

German-language Office Action issued in German Application No. 10 2019 219 700.0 dated Mar. 22, 2021 with partial English translation (11 pages).

* cited by examiner

GAS TURBINE COMBUSTOR, MANUFACTURING METHOD FOR GAS TURBINE AND GAS TURBINE COMBUSTOR

BACKGROUND OF THE INVENTION

1. Field of the Invention

The present invention relates to a gas turbine combustor, gas turbine, and method for manufacturing the gas turbine combustor.

2. Description of the Related Art

In recent years, reduction of NOx emissions has been emphasized in the development of gas turbine combustors due to social demands for reducing environmental burden. Uniform dispersion combustion is known as one method for reducing NOx emissions. The uniform dispersion combustion is a method in which fuel and air are uniformly dispersed and supplied to a combustion chamber for combustion, and NOx emissions can be reduced by suppressing the occurrence of local high temperature regions. Many gas turbine combustors that employ the uniform dispersion combustion have been proposed, and for example, a gas turbine combustor that includes a large number of fuel nozzles and a large number of air holes each arranged coaxially with each of the nozzles is known, see JP-2003-148734-A, and the like.

Here, in the gas turbine combustor, many structures in which a cylindrical outer peripheral flow path is provided on the outer periphery of the inner cylinder, or combustor liner, are employed so as to cool the inner cylinder by allowing a compressed air to flow from the compressor through the outer peripheral flow path. The compressed air that has passed through the outer peripheral flow path is turned back at the end of the combustor, and supplied to the combustion chamber to be mixed with a fuel, thus the fuel mixed with the air is burned. When uniform dispersion combustion is adopted using the structure in which the air flow path is folded back at the end of the combustor in this way, the flow rate of the air flowing into the air holes near the central axis of the combustor tends to increase, and the flow rate of the air flowing into the air holes on the outer peripheral side tends to decrease. When a deviation occurs in the air flow rate, a deviation also occurs in the fuel-air ratio between the air holes, and the flame temperature rises locally in a region where the fuel concentration is high, which causes an increase in the NOx emission amount. Moreover, the pressure loss at the time of passage of air through the air hole in the region with high air flow rate increases, which can also lead to the efficiency fall of the whole gas turbine. Therefore, it is an important issue in uniform dispersion combustion to improve measures against the deviation of the air flow rate between the air holes.

On the other hand, in order to suppress the deviation of the air flow rate by encouraging the inflow of air into the air holes on the outer peripheral side, the structure is known in which a turn guide smoothly connected to the outermost air holes from the outer peripheral flow path is mounted on the air hole plate provided with a large number of air holes, refer to JP-2017-53276-A.

SUMMARY OF THE INVENTION

However, in JP-2017-53276-A, since the turn guide is provided on the air hole plate, the positional relationship of the turn guide with respect to the inner cylinder varies depending on the machining accuracy and the assembly accuracy with respect to the inner cylinder of the air hole plate. If the positional relationship between the inner cylinder and the turn guide varies, the deviation of the air flow rate between the air holes can increase.

An object of the present invention is to provide a gas turbine combustor, a gas turbine, and a method for manufacturing the gas turbine combustor that can suppress an increase in deviation of the air flow rate due to variation in the positional relationship between the inner cylinder and the turn guide.

In order to achieve the above object, in the present invention, a gas turbine combustor that mixes fuel with compressed air guided from a compressor to burn the fuel mixed with the compressed air to generate a combustion gas and supplies the generated combustion gas to a turbine is provided with: an inner cylinder configured to form a combustion chamber thereinside; an outer cylinder configured to cover the inner cylinder and form, between the outer cylinder and the inner cylinder, a cylindrical outer peripheral flow path through which the compressed air flows; an end cover configured to close an end of the outer cylinder on an opposite side from a side the turbine is located; and a turn guide provided at an end on an end cover side of the inner cylinder, protruding from an outer peripheral surface of the inner cylinder toward the outer cylinder and smoothly connected to an inner peripheral surface of the inner cylinder.

According to the present invention, an increase in the deviation of the air flow rate due to variation in the positional relationship between the inner cylinder and the turn guide can be suppressed.

DESCRIPTION OF THE PREFERRED EMBODIMENTS

Embodiments of the present invention will be described below with reference to the drawings.

First Embodiment

—Gas Turbine Plant—

Figure 1A:
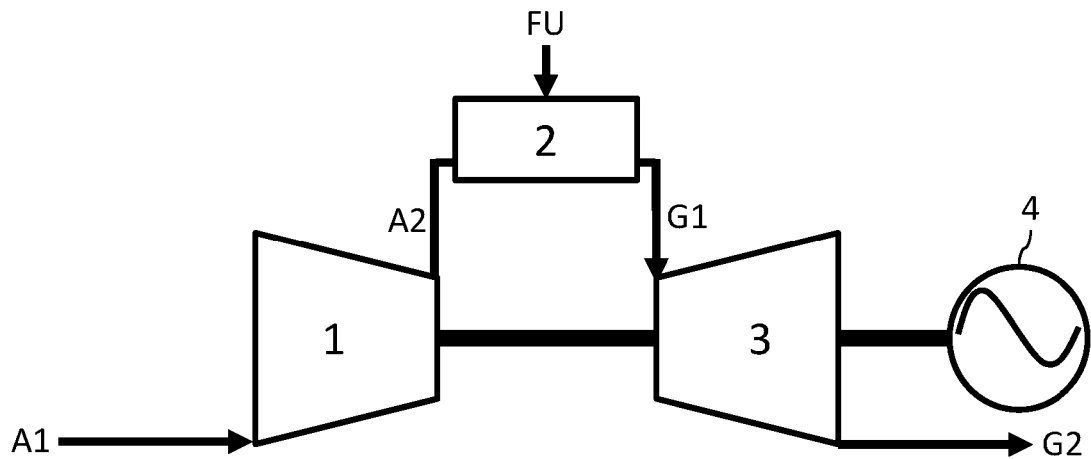
FIG. 1A is a schematic diagram of an example of a gas turbine plant to which a gas turbine combustor according to a first embodiment of the present invention is applied.

FIG. 1A is a schematic diagram of an example of a gas turbine plant to which a gas turbine combustor according to the first embodiment of the present invention is applied. The gas turbine plant illustrated in FIG. 1A includes a compressor 1, a gas turbine combustor, hereinafter abbreviated as a combustor, 2, a turbine 3, and a load apparatus 4. The compressor 1, the combustor 2, and the turbine 3 constitute a gas turbine that drives the load apparatus 4. The load apparatus 4 of the present embodiment is a generator, but a pump may be applied. In general, a gas turbine may be referred to as a "gas turbine engine," and thus in this case, the turbine may be referred to as a "gas turbine."

The compressor 1 is rotationally driven by the turbine 3 to compress air A1 taken from the inlet and generates high-pressure compressed air, or combustion air, A2 to supply the compressed air A2 to the combustor 2. The combustor 2 mixes the compressed air A2 supplied from the compressor 1 with a fuel FU supplied from a fuel system, not illustrated, burns the mixture to form a flame FL, see FIG. 1B, and generates a high-temperature combustion gas G1 to be supplied to the turbine 3. Although liquid fuel can also be used for the fuel FU, the fuel FU of the present embodiment is assumed to be gaseous fuel. The turbine 3 is connected to the compressor 1 coaxially, and is driven to rotate by expansion of the combustion gas G1 supplied from the combustor 2. The combustion gas G1 that has driven the turbine 3 is discharged from the gas turbine as an exhaust gas G2. A part of the output power of the turbine 3 is used as power for the compressor 1 and the rest is used as power for the load apparatus 4. The load apparatus 4 is coaxially connected to the compressor 1 and the turbine 3 and converts the rotational output power of the turbine 3 into electric power. In the present embodiment, a single-shaft gas turbine is illustrated, but a two-shaft gas turbine is also included in the application target of the invention. The two-shaft gas turbine includes a high-pressure turbine and a low-pressure turbine whose rotational axes are separated from each other. The high-pressure turbine is connected coaxially with the compressor, and the low-pressure turbine is connected coaxially with the load apparatus.

—Gas Turbine Combustor—

Figure 1B:
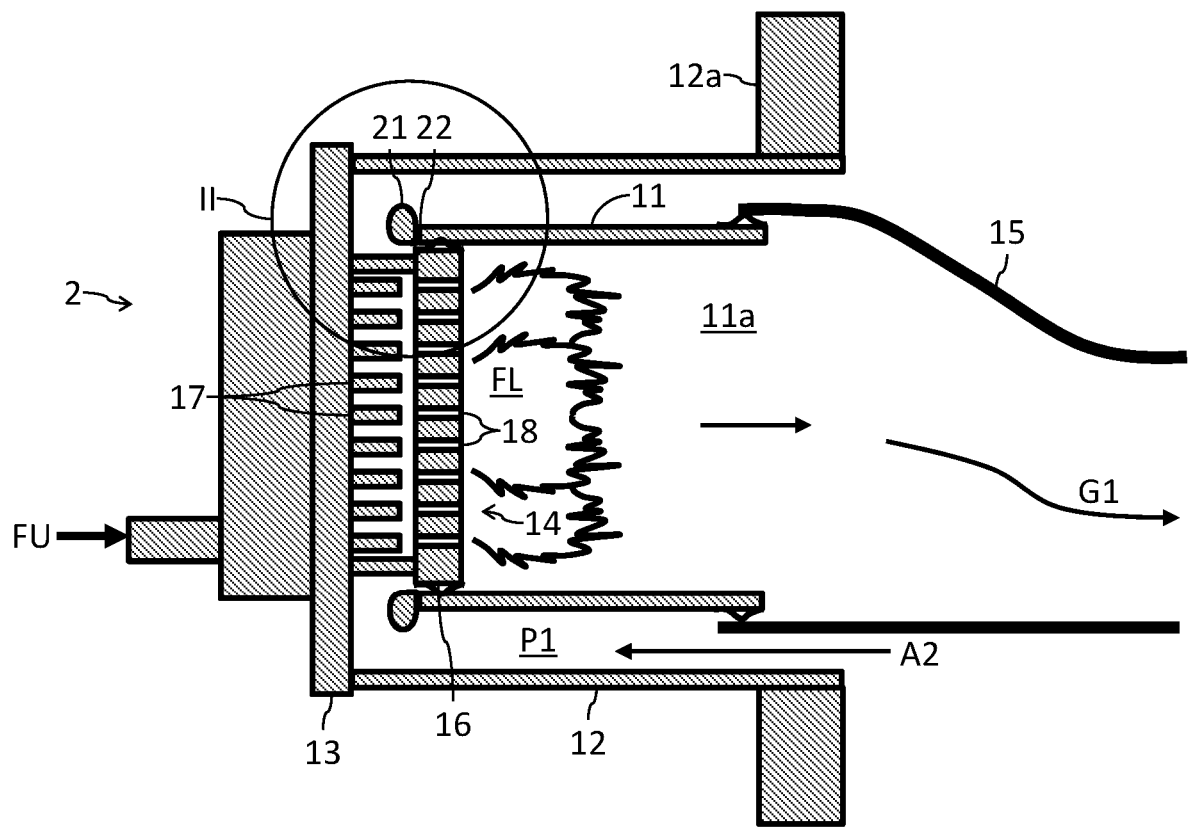
FIG. 1B is a schematic cross-sectional view illustrating the structure of the gas turbine combustor in FIG. 1A.

FIG. 1B is a schematic cross-sectional view illustrating the structure of the combustor of FIG. 1A. A plurality of combustors 2 illustrated in FIG. 1B are mounted on a casing, not illustrated, of the gas turbine in the circumferential direction. Each combustor 2 includes an inner cylinder, or combustor liner, 11, an outer cylinder, or flow sleeve, 12, an end cover 13, a burner 14, a tail covert, or transition piece, 15, and the like.

The inner cylinder 11 is a cylindrical member that forms a combustion chamber 11a therein, and separates the compressed air A2 supplied from the compressor 1 from the combustion gas G1 generated by the combustor 2. The end on the turbine side, see right side in FIG. 1B, of the inner cylinder 11 is inserted into the tail covert 15. The end on the turbine side of the tail covert 15 opens toward a working fluid flow path, not illustrated, of the turbine 3. The tail covert 15 is a member that guides the combustion gas G1 generated in the combustion chamber 11a to the turbine 3.

The outer cylinder 12 is a cylindrical member and covers the outer periphery of the inner cylinder 11 so as to form a cylindrical outer peripheral flow path P1 through which the compressed air A2 flows, between the outer cylinder 12 and the inner cylinder 11. In this configuration, the inner cylinder 11 is convectively cooled by passing the compressed air A2 through the outer peripheral flow path P1. The outer cylinder 12 has a flange 12a at the end on the turbine side, and is fixed to the casing of the gas turbine via the flange 12a. The end of the outer cylinder 12 on the opposite side from the side the turbine is located, see left side in FIG. 1B, is closed with the end cover 13. A large number of holes, not illustrated, are formed on the outer peripheral surface of the inner cylinder 11, and a part of the compressed air A2 flowing through the outer peripheral flow path P1 is led to the combustion chamber 11a from the numerous holes provided in the inner cylinder 11 and is used for film cooling of the inner peripheral surface of the inner cylinder 11. The remaining compressed air A2 except air used for film cooling of the inner cylinder 11 flows through the outer peripheral flow path P1, and is reversed after being dammed by the end cover 13, thereby being supplied to the burner 14. The compressed air A2 guided to the burner 14 is injected into the combustion chamber 11a together with the fuel FU and the mixture is burned.

—Burner—

Figure 2:
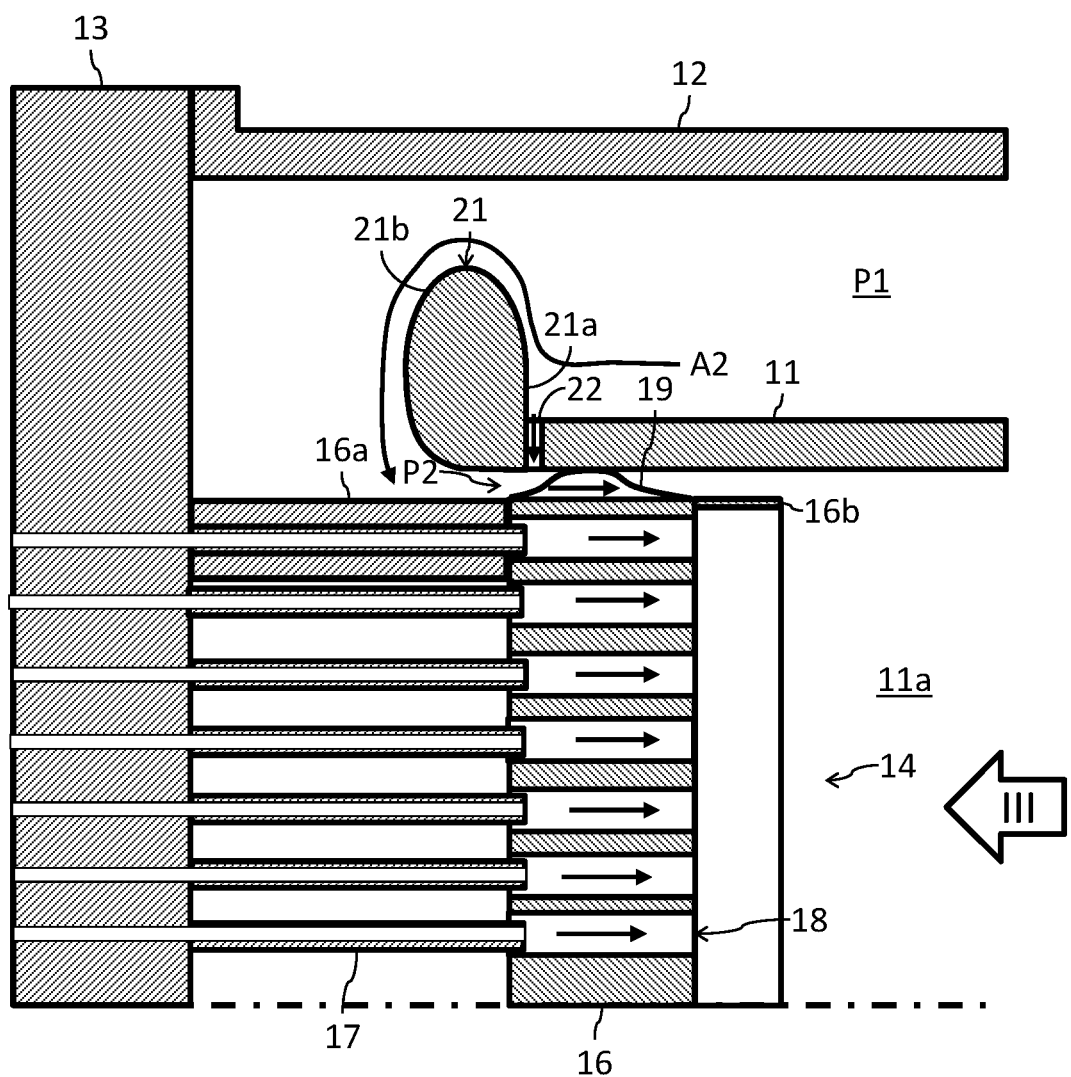
FIG. 2 is an enlarged view of portion II in FIG. 1B.
Figure 3:
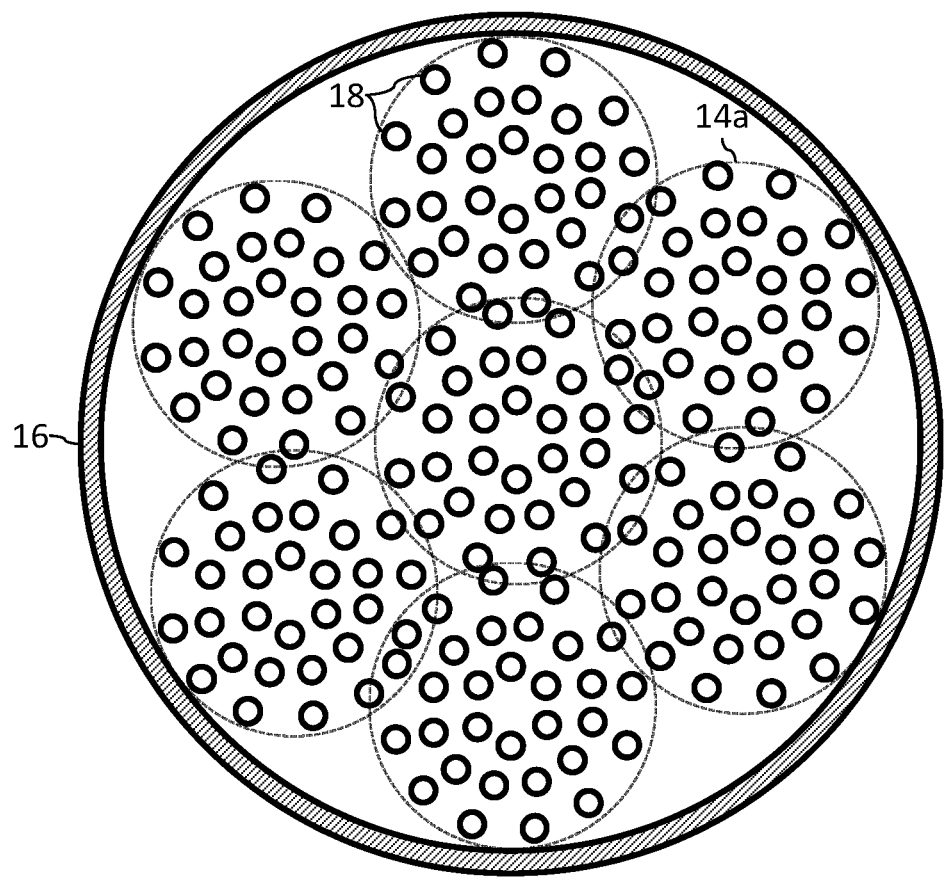
FIG. 3 is a configuration diagram of a burner viewed from the direction of arrow III in FIG. 2.

FIG. 2 is an enlarged view of portion II in FIG. 1B, and FIG. 3 is a configuration diagram of the burner viewed from the direction of arrow III in FIG. 2. The structure of the burner 14 will be described using FIGS. 2 and 3 together with FIG. 1B. As illustrated in these drawings, the burner 14 in the present embodiment includes an air hole plate 16 and a plurality of fuel nozzles 17.

The air hole plate 16 is a disk-shaped member, and is inserted from the end cover 13 side into the end on the end cover side, see left side each in FIGS. 1B and 2, of the inner cylinder 11. The air hole plate 16 is attached to the end cover 13 through a plurality of supports 16a, only one is illustrated in FIG. 2. A lip 16b, which is a cylindrical member, projects toward the combustion chamber 11a from the outer edge on the end surface of the air hole plate 16 facing the combustion chamber. The outer peripheral surfaces of the lip 16b and the air hole plate 16 are flush with each other. A spring seal 19 is interposed between the air hole plate 16 and the inner cylinder 11, that is, inner peripheral flow path P2 formed between the outer peripheral surface of the air hole plate 16 and the inner peripheral surface of the inner cylinder 11. The air hole plate 16 is held on the inner peripheral surface of the inner cylinder 11 via this spring seal 19. The spring seal 19 does not completely seal the inner peripheral flow path P2, and includes a plurality of slits, not illustrated.

Figure 4:
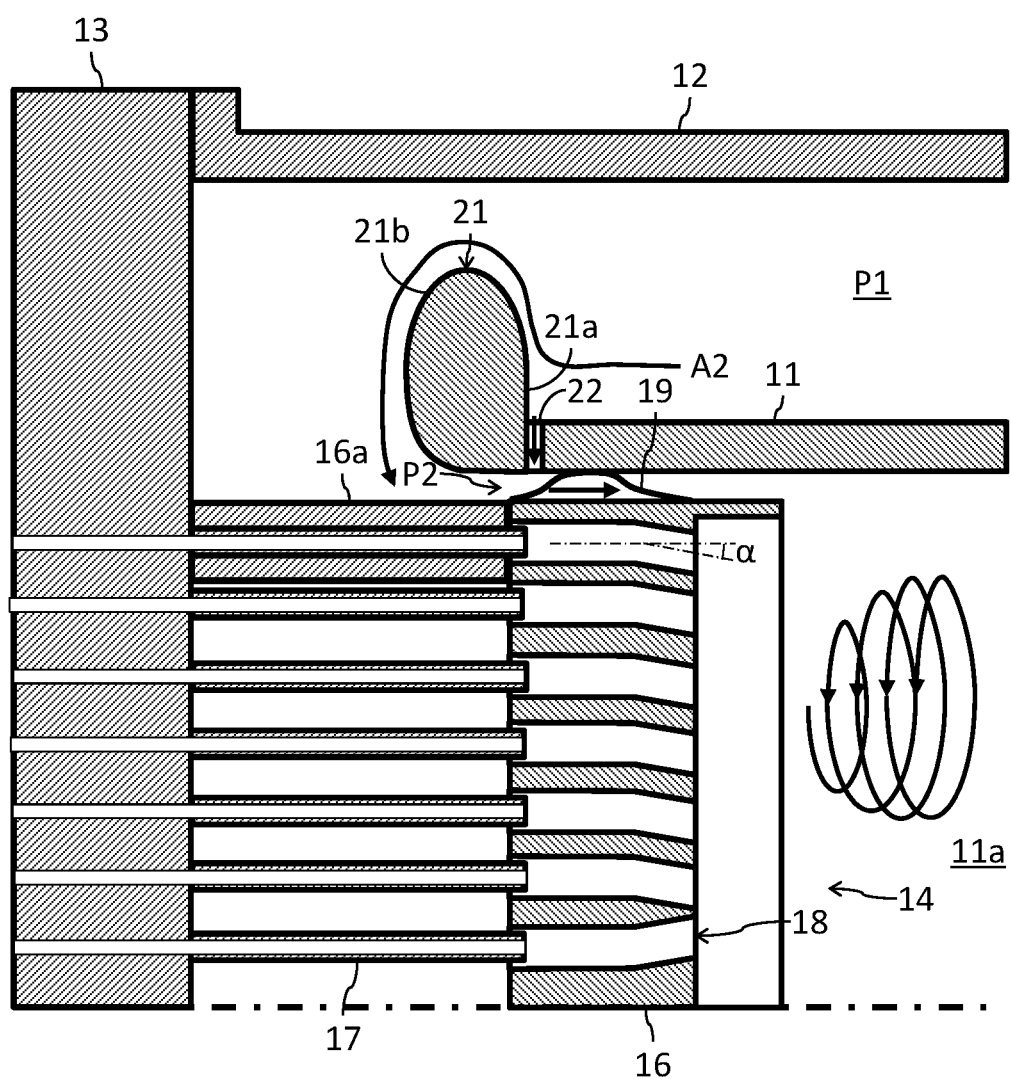
FIG. 4 is a diagram illustrating another configuration example of the burner.

The air hole plate 16 is provided with a plurality of air holes 18 penetrating from the end cover side toward the combustion chamber 11a. The present embodiment illustrates by an example a case where a multi-burner including a plurality of burners, hereinafter, referred to as a partial burner 14a to be distinguished from the burner 14, is used as the burner 14. Note that, the present invention is also applicable to gas turbine combustors in which a single partial burner 14a is used as the burner 14. In FIG. 3, a group of air holes surrounded by a broken-line circle constitutes a single partial burner 14a, and the periphery of a central partial burner 14a is surrounded by a plurality, six in this example, of partial burners 14a to form the burner 14 in the present embodiment. In each partial burner 14a, the plurality of air holes 18 form a plurality of concentric annular rows as viewed from the combustion chamber 11a. Although FIG. 2 illustrates a configuration in which the air holes 18 extend linearly along the combustor central axis, the air holes 18 may be inclined at an angle α relative to the combustor central axis as illustrated in FIG. 4 in order to form a swirl flow in the combustion chamber 11a.

The plurality of fuel nozzles 17 are arranged on the end cover side with respect to the air hole plate 16 so as to each inject the fuel FU into the combustion chamber 11a through each corresponding air hole 18 among the plurality of air holes 18, and form a uniform dispersion combustion burner that uniformly disperses the fuel and air for combustion. In the present embodiment, a structure in which the fuel nozzles 17 are supported by the end cover 13 is illustrated. Each individual fuel nozzle 17 extends in parallel with the combustor central axis, and is arranged coaxially with each corresponding air hole 18, or inlet of the air hole 18, and the tip is inserted into the air hole 18. Further, the inner diameter of the air hole 18 is larger than the outer diameter of the fuel nozzle 17, and a clearance through which the compressed air A2 flows is ensured between the outer peripheral surface of the fuel nozzle 17 and the inner peripheral surface of the air hole 18. In some cases, the tip of the fuel nozzle 17 may not be inserted into the air hole 18 and the fuel nozzle 17 may be spaced from the air hole 18.

—Turn Guide—

In the present embodiment, a turn guide 21 and a plurality of cooling air holes 22 are provided in the vicinity of the burner 14 in the inner cylinder 11 so as to be located at the reversal part of the flow path of the compressed air A2, that is, at an end on the end cover side of the outer peripheral flow path P1. As described above, the turn guide 21 is provided on the inner cylinder 11 as a feature.

The turn guide 21 is a member that suppresses a flow rate deviation of the compressed air A2 that passes through each air hole 18. The turn guide 21 is provided at the end on the end cover side, see left side in FIG. 2, of the inner cylinder 11, and includes an interference surface 21a and a guide surface 21b so as to protrude from the outer peripheral surface of the inner cylinder 11 toward the outer cylinder and to be smoothly connected to the inner peripheral surface of the inner cylinder 11. The protrusion amount of the turn guide 21 from the outer peripheral surface of the inner cylinder 11 toward the outer cylinder is not particularly limited, but the present specification illustrates a case where the protrusion amount is 50% or 60% of the distance from the inner cylinder 11 to the outer cylinder 12, or the thickness of the outer peripheral flow path P1, as an example in each of the embodiments.

The interference surface 21a is an element for interfering with and decelerating the flow of the compressed air A2 flowing along the outer peripheral surface of the inner cylinder 11 in the outer peripheral flow path P1, and rises from the outer peripheral surface of the inner cylinder 11 toward the outer cylinder 12 so as to interfere with the compressed air A2 flowing near the outer peripheral surface of the inner cylinder 11 in the outer peripheral flow path P1. The interference surface 21a may be inclined either to the turbine side or to the end cover side with respect to a surface perpendicular to the inner cylinder 11, but in the present embodiment, the interference surface 21a is illustrated as a flat surface perpendicular to the inner cylinder 11.

The guide surface 21b is an element for actively guiding the flow of the compressed air A2 that has been decelerated by interference from the interference surface 21a to the air holes 18 disposed on the outer peripheral side of the air hole plate 16, and is configured by a curved surface so as to smoothly connect the inner peripheral surface of the inner cylinder 11 and the interference surface 21a. The guide surface 21b extends from the interference surface 21a toward the outer cylinder, turns to the end cover side arcuately, that is, counterclockwise in the cross section of FIG. 2, and finally extends to the turbine side to connect to the inner peripheral surface of the inner cylinder 11. As illustrated in FIG. 2, when viewed in a cross section taken along a plane including the combustor central axis, the turn guide 21 has a cross-sectional shape formed by providing a thick flange on the inner cylinder 11 and rounding, or smoothing, the corners of the flange. The edge of the guide surface 21b closest to the end cover 13 is located on the end cover side with respect to the end surface on the end cover side of the air hole plate 16.

The plurality of cooling air holes 22 are provided in the inner cylinder 11 along the interference surface 21a of the turn guide 21. The plurality of cooling air holes 22 are provided on the outer peripheral surface of the inner cylinder 11 at regular intervals in the circumferential direction. The cooling air holes 22 according to the present embodiment are located on the end cover side with respect to the spring seal 19 and connect the outer peripheral flow path P1 and the inner peripheral flow path P2.

—Operation—

During the operation of the gas turbine, the air A1 is taken into the compressor 1 and compressed, and then discharged from the compressor 1 as the high-pressure compressed air A2. The compressed air A2 discharged from the compressor 1 is supplied to the combustor 2 and mixed with the fuel FU supplied from a fuel system, not illustrated, and the mixture is burned to generate a high-temperature combustion gas G1. The turbine 3 is driven by the high-temperature combustion gas G1 thus generated, and the load apparatus 4 is driven by the rotational output power of the turbine 3.

The flow of the working fluid in the combustor 2 during this period will be described. First, the region outside the inner cylinder 11 inside the combustor 2 is pressurized by the compressed air A2 being sent in, and has a higher pressure than the combustion chamber 11a, or inside the inner cylinder 11, that sends out the combustion gas G1. Therefore, the compressed air A2 that has passed through the outer peripheral flow path P1 and is dammed by the end cover 13 is pulled and reversed due to the pressure difference and flows into the air holes 18 of the air hole plate 16. At the same time, the fuel FU is injected from the fuel nozzle 17 into the air hole 18 and the fuel FU and the compressed air A2 are ejected from each air hole 18 into the combustion chamber 11a in a mixed state. Further, a part of the compressed air A2 flows into the inner peripheral flow path P2 between the inner cylinder 11 and the air hole plate 16 from the flow path inlet on the end cover side and the cooling air holes 22, and further flows through the inner peripheral flow path P2 to cool the air hole plate 16 and to be ejected to the combustion chamber 11a.

At this time, a part of the compressed air A2 flowing near the outer peripheral surface of the inner cylinder 11 in the outer peripheral flow path P1 gets interference from the interference surface 21a of the turn guide 21 and is decelerated to recover the static pressure in the present embodiment. The compressed air A2 that has gotten interference from the interference surface 21a and weakened in momentum is sucked into the cooling air holes 22 or is guided by the guide surface 21b of the turn guide 21 while turning around to be sucked into the air holes 18 located on the relatively outer peripheral position of the air hole plate 16 or the inner peripheral flow path P2. In this way, by actively guiding the compressed air A2 also to the outer peripheral side of the air hole plate 16, the flow rate deviation at the inner and outer periphery of the air hole plate 16 is suppressed.

Comparative Example

Figure 5:
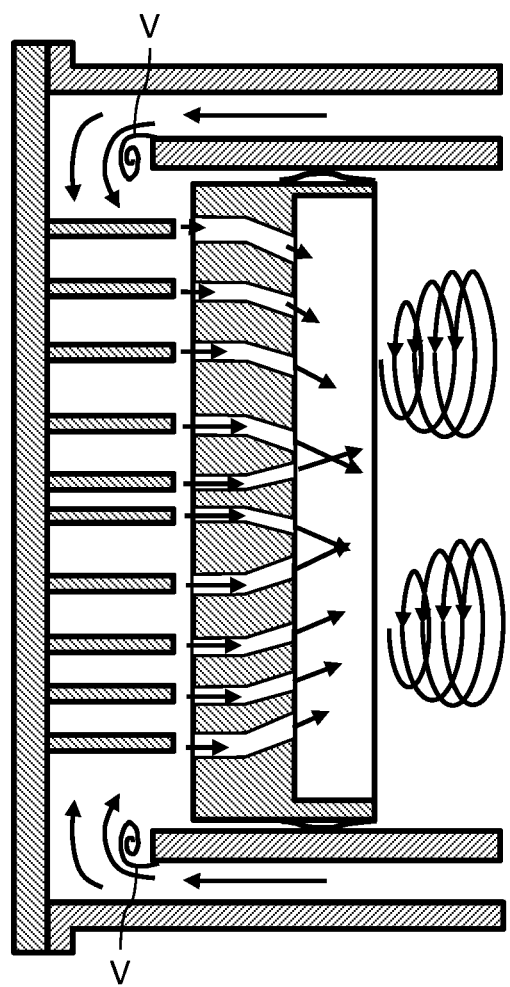
FIG. 5 is a partial cross-sectional view of a gas turbine combustor according to a comparative example.

FIG. 5 is a partial cross-sectional view of a gas turbine combustor according to a comparative example. In the gas turbine combustor illustrated in FIG. 5, there is no turn guide at the end of the inner cylinder. In this case, a separation vortex V is generated at the reversal portion of the flow path due to the flow of the compressed air that has passed through the outer peripheral flow path, and it is difficult for air to flow into the air holes on the outer peripheral side of the air hole plate. Therefore, the deviation of the air flow rate between the air holes on the inner peripheral side and the outer peripheral side of the air hole plate increases. In particular, the fuel concentration of the air-fuel mixture ejected from the air holes on the outer peripheral side of the air hole plate to the combustion chamber becomes high, which becomes an increase factor of the NOx emission amount. Further, the flow velocity of the compressed air passing through the air holes on the inner peripheral side of the air hole plate becomes faster, and thus the pressure loss can increase.

Figure 6:
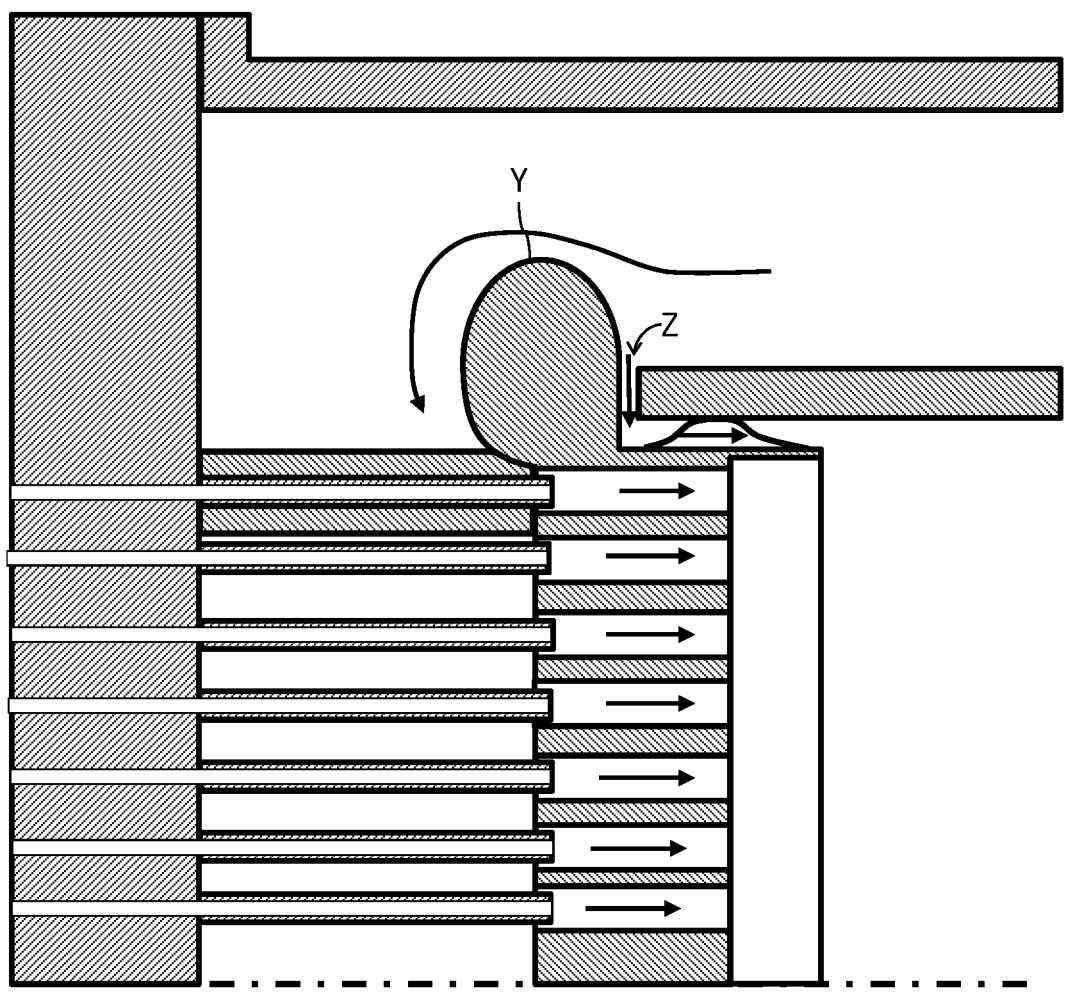
FIG. 6 is a partial cross-sectional view of a gas turbine combustor according to another comparative example.

FIG. 6 is a partial cross-sectional view of a gas turbine combustor according to another comparative example. The configuration illustrated in FIG. 6 is described in JP-2017-53276-A, and a turn guide Y is provided on the air hole plate in order to suppress the deviation of the air flow rate generated in the example of FIG. 5. A clearance between the inner cylinder and the turn guide Y serves as an inlet Z of the inner peripheral flow path. However, in the example of FIG. 6, the machining accuracy and assembly accuracy of the air hole plate, the turn guide, and the inner cylinder greatly affect the protrusion amount of the turn guide Y from the outer peripheral surface of the inner cylinder toward the outer cylinder, and therefore variation in the protruding amount of the turn guide tends to occur. Further, the inlet Z of the inner peripheral flow path is narrowed due to thermal deformation of the air hole plate during operation, and is blocked in a severe case. As a result, the compressed air does not flow into the inner peripheral flow path, and the cooling air of the air hole plate is insufficient.

—Effect—

(1) In the present embodiment, a part of the compressed air A2 flowing through the outer peripheral flow path P1 is caused to get interference from the interference surface 21a of the turn guide 21, and the decelerated compressed air A2 is guided to the outer peripheral side of the burner 14 by the guide surface 21b. Thereby, generation of the separation vortex V illustrated in the example of FIG. 5 can be suppressed, and the deviation of the air flow rate between the inner peripheral side and an outer peripheral side of the burner 14 can be suppressed so that the generation of NOx can also be suppressed. Further, since the inner cylinder 11 is integrally provided with the turn guide 21, the centers thereof coincide with each other, which can also suppress variation in the protrusion amount of the turn guide 21 from the outer peripheral surface of the inner cylinder 11 due to variations in the positional relationship between the turn guide 21 and the inner cylinder 11 caused depending on assembly accuracy and machining accuracy. Therefore, an increase in the deviation of the air flow rate because of the variation in the positional relationship between the inner cylinder 11 and the turn guide 21 can be suppressed.

(2) Further, since a change in the area of the inlet opening of the inner peripheral flow path P2 due to the thermal deformation of the air hole plate 16 does not occur, decrease in the cooling air flow rate due to the thermal deformation of the air hole plate 16 can be suppressed.

(3) Since the air-fuel mixture of the compressed air A2 and the fuel FU is ejected from a number of air holes 18 formed in the air hole plate 16 to the combustion chamber 11a, the NOx reduction effect by the uniform dispersion combustion is high. However, in order to obtain the above essential effect (1), in the case of a gas turbine combustor in which a plurality of burners are disposed in a concentric arrangement, see JP-2018-189288-A and the like, the same effect can be obtained by mounting a turn guide on the inner cylinder and equalizing the fuel-air ratio of the air-fuel mixture of the inner and outer burners. Therefore, the application target is not necessarily limited to the gas turbine combustor using the air hole plate 16.

Second Embodiment

Figure 7:
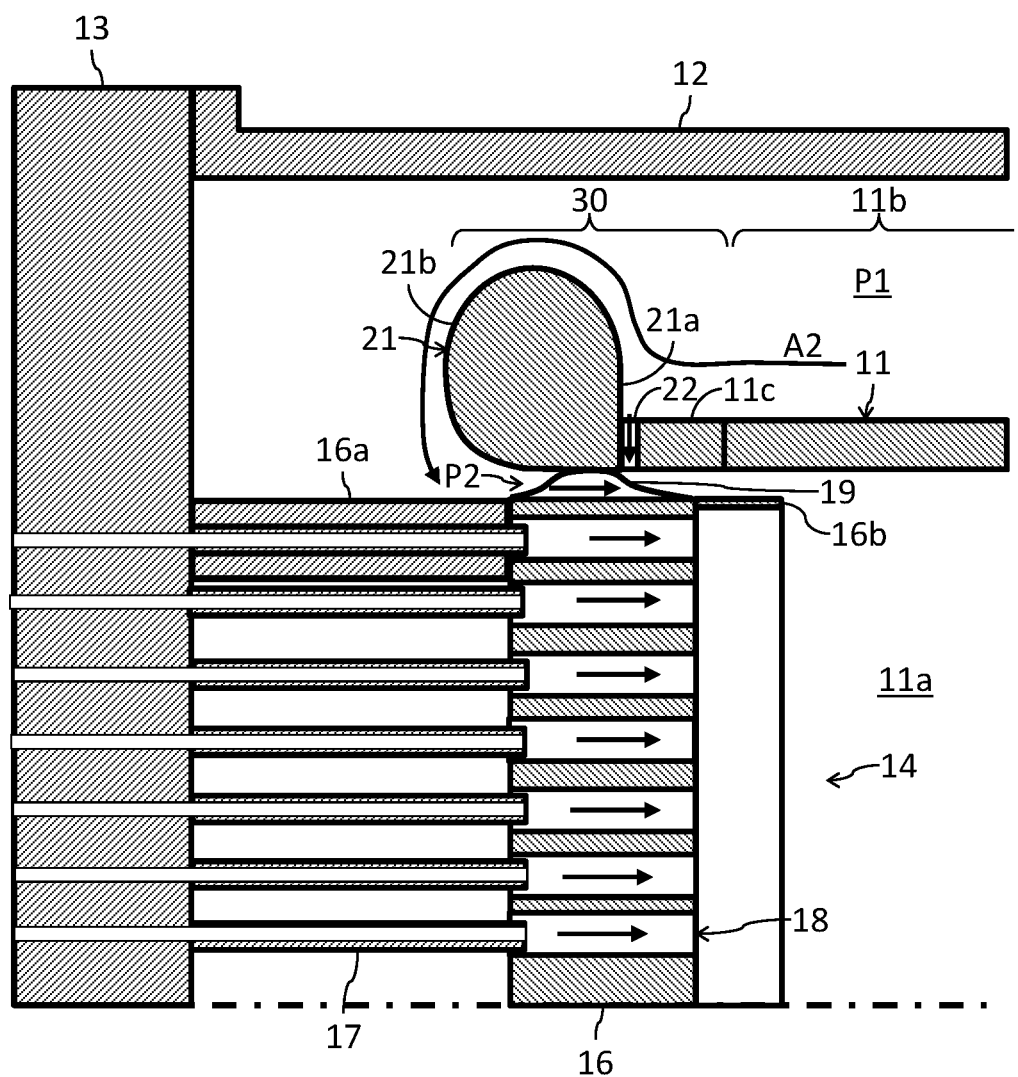
FIG. 7 is a partial cross-sectional view illustrating the main structure of a gas turbine combustor according to a second embodiment of the present invention.

FIG. 7 is a partial cross-sectional view illustrating the main structure of a gas turbine combustor according to the second embodiment of the present invention, and corresponds to FIG. 2 of the first embodiment. In the present embodiment, elements that are the same as or correspond to those in the embodiment already described are denoted by the same reference numerals as those in the previous drawings in FIG. 7, and description thereof will be omitted as appropriate.

The present embodiment is different from the first embodiment mainly in that the plurality of cooling air holes 22 are provided in the inner cylinder 11 so as to be located on the turbine side with respect to the spring seal 19. The turn guide 21 of the present embodiment is thicker than that of the first embodiment, and a part of the turn guide 21 is located on the turbine side with respect to the spring seal 19, strictly speaking, located on the turbine side with respect to the contact portion of the spring seal 19 with the inner cylinder 11, and all the contact portions when there are a plurality of contact portions. The turbine-side edge, or interference surface 21a, of the turn guide 21 is located on the turbine side with respect to the spring seal 19, that is, a contact portion of the spring seal 19 with the inner cylinder 11, and the end cover-side edge is located on the end cover side with respect to the spring seal 19, that is, the contact portion of the spring seal 19 with the inner cylinder 11. That is, the turn guide 21 extends across the spring seal 19, that is, the contact portion of the spring seal 19 with the inner cylinder 11. The plurality of cooling air holes 22 are provided along the interference surface 21a of the turn guide 21 as in the first embodiment, and are located on the turbine side with respect to the spring seal 19, that is, the contact portion of the spring seal 19 with the inner cylinder 11. Regarding other structures, the present embodiment is the same as the first embodiment. Also in the present embodiment, the same effect as the first embodiment can be obtained.

Here, when the turn guide is provided on the air hole plate as illustrated in FIG. 6, if the cooling air holes for sucking the compressed air stagnated by interference with the interference surface into the inner peripheral flow path are formed along the interference surface, a clearance must be prepared between the interference surface of the turn guide and the inner cylinder, to cause this clearance to serve as a cooling air hole. In the structure of FIG. 6, due to presence of a turn guide, the opening of the inlet of the inner peripheral flow path cannot be provided on the end cover side, and the clearance between the interference surface of the turn guide and the inner cylinder also serves as the inlet of the inner peripheral flow path. And this inlet is necessarily located on the end cover side of the spring seal interposed between an air hole plate and an inner cylinder. As a result, the compressed air sucked into the inner peripheral flow path from the vicinity of the interference surface is accompanied by pressure loss not only when flowing into the inner peripheral flow path but also when passing through the spring seal.

On the other hand, in the present embodiment, since the turn guide 21 is separated from the air hole plate 16, the inlet of the inner peripheral flow path P2 opens toward the end cover as in the structure having no turn guide as in the example of FIG. 5. Therefore, the cooling air holes 22 along the interference surface 21a of the turn guide 21 can be provided on the inner cylinder 11 separately from the inlet. In the present embodiment, since the turn guide 21 is provided on the inner cylinder 11, the positional relationship between the turn guide 21 and the spring seal 19 is not restricted as in the example of FIG. 6. Therefore, the turn guide 21 is made thick so that the interference surface 21a is located on the turbine side with respect to the spring seal 19, and due to this, the cooling air holes 22 along the interference surface 21a can be arranged on the turbine side with respect to the spring seal 19 as in the present embodiment. Since the cooling air holes 22 are located on the turbine side with respect to the spring seal 19, the compressed air A2 flowing into the inner peripheral flow path P2 from the cooling air holes 22 is ejected into the combustion chamber 11a without passing through the spring seal 19. The pressure loss of the compressed air A2 sucked from the cooling air holes 22 can be reduced according to the quantity of the air that bypasses the spring seal 19.

—Manufacturing Method—

By utilizing the advantage that the positional relationship between the turn guide 21 and the spring seal 19 is not restricted as in the example of FIG. 6, the following manufacturing method can be applied in the present embodiment.

First, a component 30 including the turn guide 21 is manufactured separately from a main body 11b of the inner cylinder 11. The component 30 is a unit including a cylindrical portion 11c, the turn guide 21, and the plurality of cooling air holes 22. The cylindrical portion 11c is a portion that constitutes a part of the inner cylinder 11. The turn guide 21 is provided at an end portion on the end cover side of the cylindrical portion 11c, and protrudes from the outer peripheral surface of the inner cylinder 11, or cylindrical portion 11c, toward the outer cylinder 12, and connects smoothly with the inner peripheral surface of the inner cylinder 11, or cylindrical portion 11c. The cooling air holes 22 are provided in the cylindrical portion 11c. The cooling air holes 22 only need to be in the vicinity of the interference surface 21a of the turn guide 21, but in the present embodiment, the cooling air holes 22 are provided along the interference surface 21a as in the first embodiment.

Next, the length of the inner cylinder 11, or main body 11b, is adjusted, and the component 30 is joined to the end portion, or the end portion of the end cover side, of the inner cylinder 11, or main body 11b. To be specific, the length of the main body 11b of the inner cylinder 11 is adjusted so that the plurality of cooling air holes 22 are positioned on the turbine side of the spring seal 19, or the contact portion of the spring seal 19 with the inner cylinder 11, when the component 30 is joined to the end on the end cover side of the main body 11b of the inner cylinder 11. When being longer, the main body 11b is cut, and when being shorter, the main body 11b is lengthen by joining a ring or the like thereto. Then, the end of the cylindrical portion 11c is aligned with the end on the end cover side of the main body 11b of the inner cylinder 11 and joined by an appropriate joining method such as welding or friction stir welding so that the component 30 is joined to the main body 11b of the inner cylinder 11.

By adopting such a manufacturing method, the gas turbine combustor according to the present embodiment can be efficiently manufactured.

Third Embodiment

Figure 8:
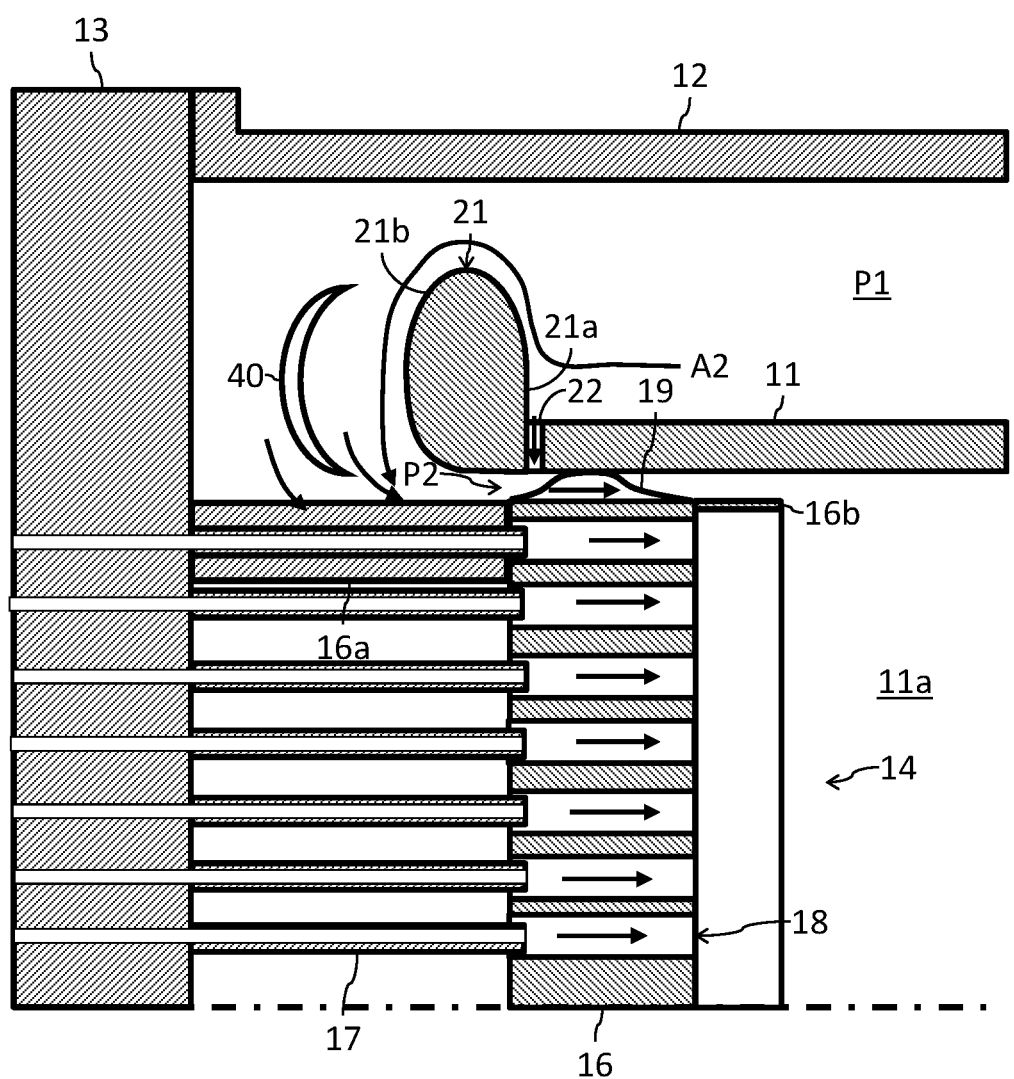
FIG. 8 is a partial cross-sectional view illustrating the main structure of a gas turbine combustor according to a third embodiment of the present invention.

FIG. 8 is a partial cross-sectional view illustrating the main structure of a gas turbine combustor according to the third embodiment of the present invention, and corresponds to FIG. 2 of the first embodiment. In the present embodiment, elements that are the same as or correspond to those in already described embodiments are given the same reference numerals as those in the previous drawings in FIG. 8, and description thereof will be omitted as appropriate.

The present embodiment is different from the first embodiment in that a turn vane 40 is disposed between the turn guide 21 and the end cover 13, and in the present embodiment, disposed on the outer cylinder side, or outside in the combustor radial direction, with respect to the supports 16a. The turn vane 40 has an arcuate cross-sectional shape projected toward the end cover side, see left side in FIG. 8, with the recessed ventral side surface, or pressure surface, facing the turn guide 21 and the projected back side surface, or negative pressure surface, facing the end cover 13. The ventral side surface of the turn vane 40 forms a curved surface substantially along the guide surface 21b of the turn guide 21. The turn vane 40 is a ring-shaped member that surrounds the plurality of fuel nozzles 17, but a structure in which a plurality of vanes are arranged annularly can also be employed. In the present embodiment, the turn vane 40 is disposed at a position that is substantially equidistant from the turn guide 21 and the end cover 13, but the turn vane 40 may be disposed closer to the end cover 13 or may be disposed closer to the turn guide 21 according to parameters such as the air flow rate. Other configurations are the same as those of the first embodiment. Moreover, the features of the second embodiment can also be combined with the present embodiment.

In the present embodiment, the following effects are obtained in addition to the same effects as in the first embodiment. The compressed air A2 flowing in the vicinity of the outer peripheral surface of the inner cylinder 11 in the outer peripheral flow path P1 gets interference from the interference surface 21a of the turn guide 21 to decelerate, and is led mainly to the outer peripheral side of the air hole plate 16 along the guide surface 21b. However, a part of the flow of the compressed air A2 can be separated from the guide surface 21b of the turn guide 21. In the present embodiment, by providing the turn vane 40 on the downstream side of the turn guide 21, the separation of the flow from the guide surface 21b can be suppressed, and the flow can be guided in a direction corresponding to the shape of the turn vane 40. Thereby, the deviation of the air flow rate on the inner peripheral side and the outer peripheral side of the air hole plate 16 can be more effectively suppressed, and the mixing performance of the compressed air A2 and the fuel FU and measures against the pressure loss can be improved more flexibly.

Fourth Embodiment

Figure 9:
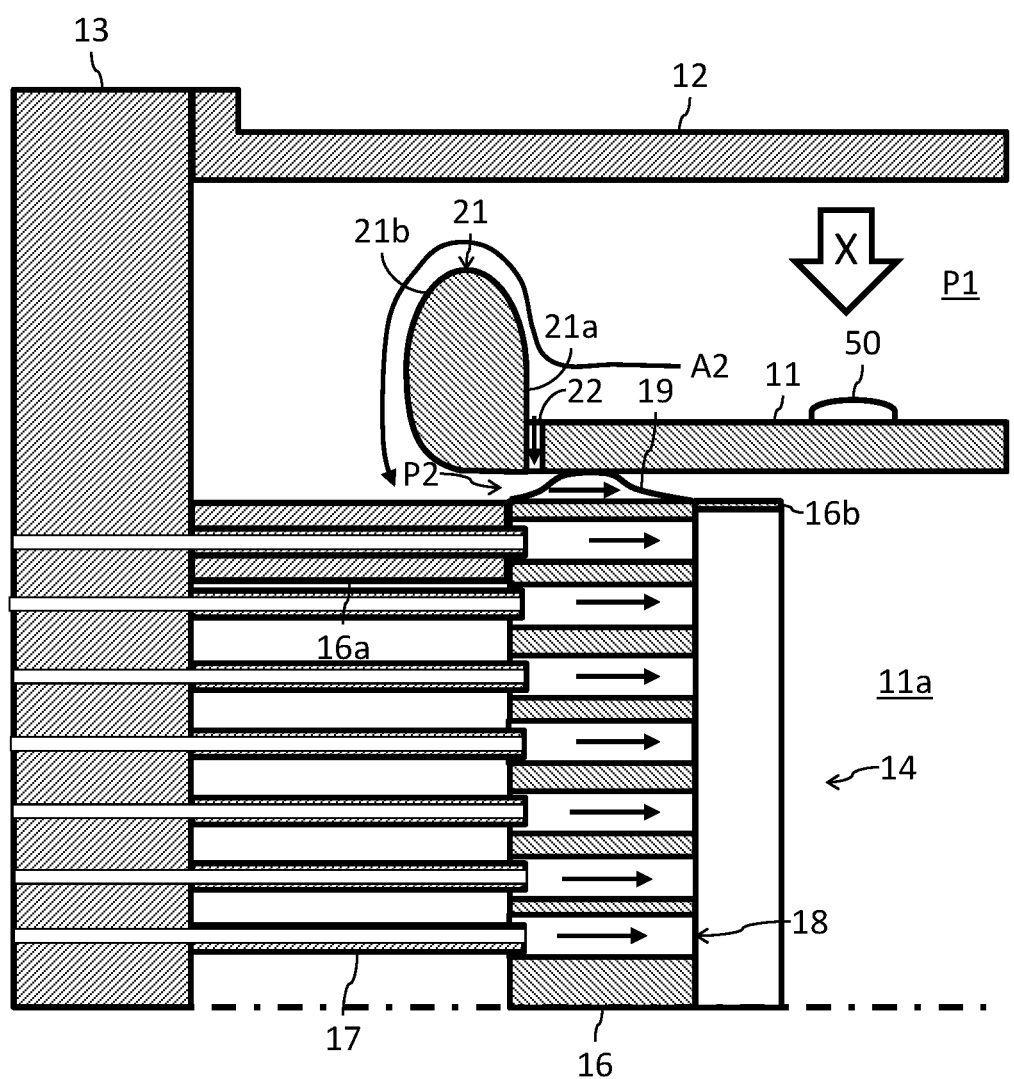
FIG. 9 is a partial cross-sectional view illustrating the main structure of a gas turbine combustor according to a fourth embodiment of the present invention.
Figure 10:
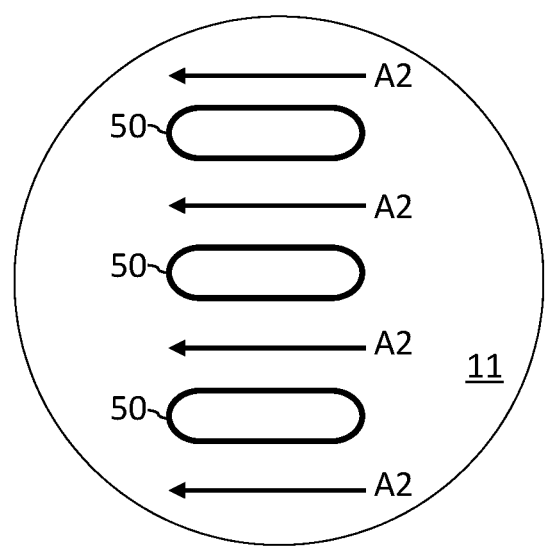
FIG. 10 is a diagram of a straightening guide viewed in the direction indicated by arrow X in FIG. 9, that is, from the outer periphery in the combustor radial direction.

FIG. 9 is a partial cross-sectional view illustrating the main structure of a gas turbine combustor according to the fourth embodiment of the present invention, and FIG. 10 illustrates the straightening guides viewed in the direction indicated by arrow X in FIG. 9, that is, from the outer periphery in the combustor radial direction. In the present embodiment, elements that are the same as or correspond to those in already described embodiments are denoted by the same reference numerals in FIGS. 9 and 10, and description thereof will be omitted as appropriate.

The present embodiment is different from the first embodiment in that a plurality of straightening guides 50 arranged side by side in the circumferential direction on the outer peripheral surface of the inner cylinder 11 are provided. Each straightening guide 50 has a shape extending in the direction of the central axis of the combustor 2, or the flow direction of the compressed air A2, as illustrated in FIG. 10. In order to suppress the pressure loss, the straightening guide 50 has an elliptical shape, but the shape can be variously changed into a streamlined shape or an oval shape, for example. Other configurations are the same as those of the first embodiment. In addition, features of at least one of the second embodiment and the third embodiment can also be combined with the present embodiment.

In the present embodiment, the following effects are obtained in addition to the same effects as in the first embodiment. Since the inflow path of the compressed air A2 from the compressor 1 to the combustor 2 is not concentric with the inner cylinder 11 or the outer cylinder 12, see JP-2018-189288-A and the like, the flow rate deviation of the compressed air A2 in the outer peripheral flow path P1 may occur in the circumferential direction. Measures against this deviation are improved by the straightening guides 50, and the flow rate deviation on the inner and outer peripheral sides of the air hole plate 16 can be more efficiently suppressed.

Fifth Embodiment

Figure 11:
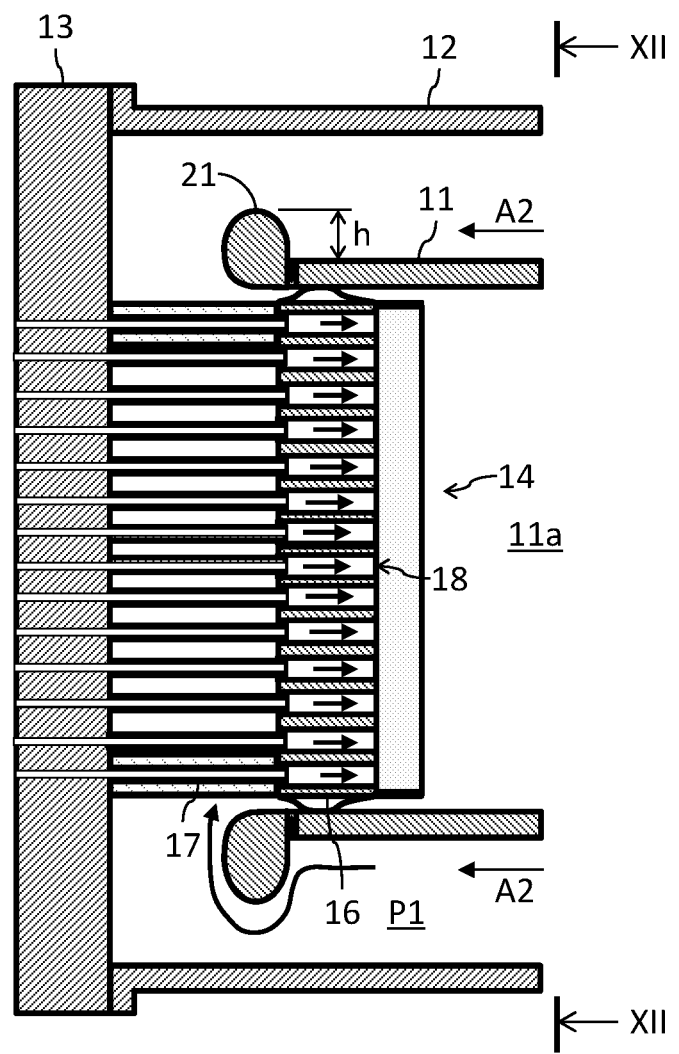
FIG. 11 is a partial cross-sectional view illustrating the main structure of a gas turbine combustor according to a fifth embodiment of the present invention.
Figure 12:
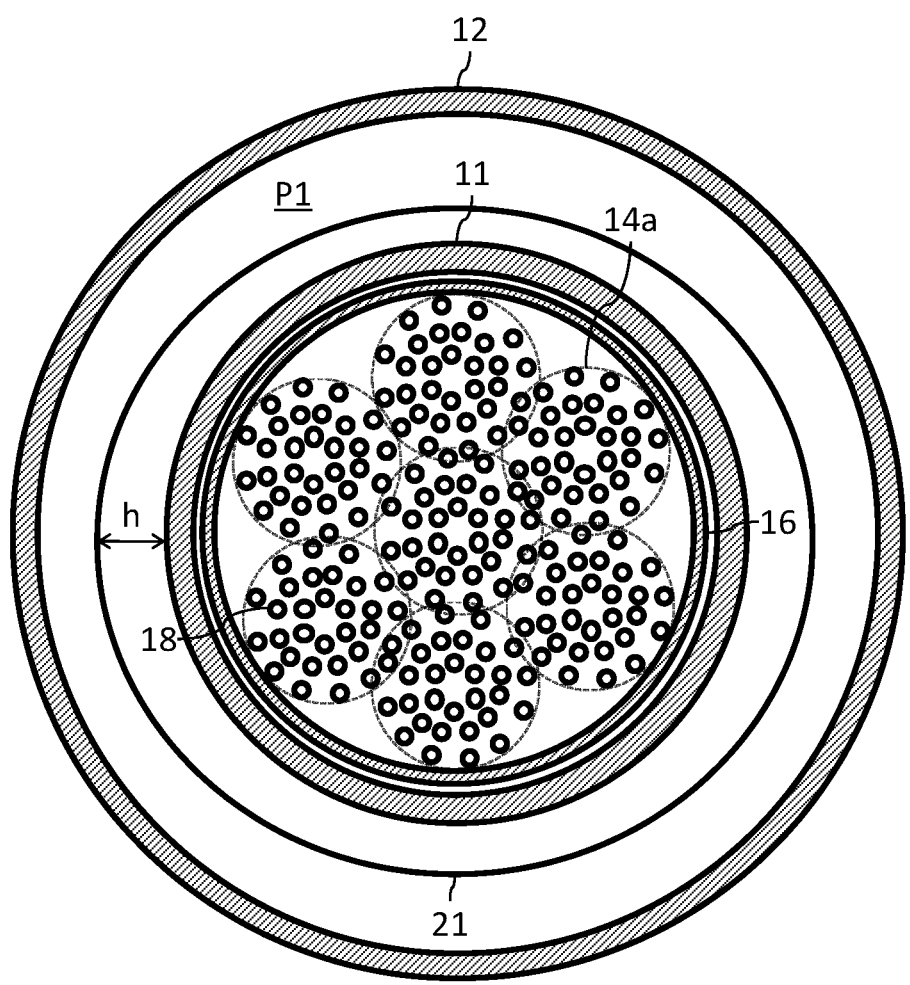
FIG. 12 is a cross-sectional view taken along line XII-XII in FIG. 11.

FIG. 11 is a partial cross-sectional view illustrating the main structure of a gas turbine combustor according to the fifth embodiment of the present invention, and FIG. 12 is a cross-sectional view taken along line XII-XII in FIG. 11. In the present embodiment, elements that are the same as or correspond to those in already described present embodiments are denoted by the same reference numerals in FIGS. 11 and 12, and description thereof will be omitted as appropriate.

The present embodiment is different from the first embodiment in that a distance h from the outer peripheral surface of the inner cylinder 11 to the outer peripheral surface of the turn guide 21, that is, the protrusion amount of the turn guide 21 from the outer peripheral surface of the inner cylinder 11, is formed differently depending on the position in the circumferential direction. The aspect of variation of the distance h depends on the flow rate of the compressed air A2 in the outer peripheral flow path P1. For example, the distance h is increased where the flow rate is large, and the distance h is decreased where the flow rate is small. Other configurations are the same as those of the first embodiment. In addition, at least one feature of the second to fourth embodiments can also be combined with the present embodiment.

In the present embodiment, the following effects are obtained in addition to the same effects as in the first embodiment. As described above, a deviation in the circumferential direction may occur in the flow rate of the compressed air A2 in the outer peripheral flow path P1. By mounting the turn guide 21 in which the distance h is varied according to the flow rate deviation in the circumferential direction, measures against the flow rate deviation in the circumferential direction of the outer peripheral flow path P1 is improved so that the flow deviation of the inner and outer peripheral sides of the air hole plate 16 can be suppressed more efficiently.

What is claimed is:
1. A method of manufacturing a gas turbine combustor configured to mix fuel with compressed air guided from a compressor to burn the fuel mixed with the compressed air to generate a combustion gas and supply the generated combustion gas to a turbine, the gas turbine combustor including
an inner cylinder configured to form a combustion chamber thereinside,
an outer cylinder configured to cover the inner cylinder and form, between the outer cylinder and the inner cylinder, an annular outer peripheral flow path through which the compressed air flows,
an end cover configured to close an end of the outer cylinder on a side opposite the turbine,
an air hole plate that is inserted into the inner cylinder from an end cover side of the inner cylinder and that has a plurality of air holes guiding the compressed air that has passed through the outer peripheral flow path, and which has been dammed by the end cover into the combustion chamber,
a plurality of fuel nozzles disposed on the end cover side with respect to the air hole plate so as to each inject the fuel into the combustion chamber through each associated air hole among the plurality of air holes, and
a spring seal provided between the air hole plate and the inner cylinder, the method comprising:
producing a component including a cylindrical portion constituting a part of the inner cylinder, a turn guide provided at an end of the cylindrical portion, on an end cover side of the cylindrical portion, and a plurality of cooling air holes provided in the cylindrical portion; and
joining the component to the end of the inner cylinder after adjusting a length of the inner cylinder such that the plurality of cooling air holes are positioned between a portion of the spring seal which contacts the inner cylinder and a turbine side of the inner cylinder, the turn guide protruding from the inner cylinder such that an interference surface of the turn guide rises from an outer peripheral surface of the inner cylinder toward the outer cylinder and is connected to an inner peripheral surface of the inner cylinder by a curved surface of the turn guide,
wherein the outer peripheral surface extends substantially axially along a longitudinal axis of the inner cylinder, the interference surface extends substantially radially relative to the longitudinal axis of the inner cylinder, and
a plurality of cooling air holes are provided in the inner cylinder along the interference surface of the turn guide, the plurality of cooling air holes being defined in part by the inner cylinder and in part by the interference surface.

2. A gas turbine combustor configured to mix fuel with compressed air guided from a compressor to burn the fuel mixed with the compressed air to generate a combustion gas and supply the generated combustion gas to a turbine, the gas turbine combustor comprising:
- an inner cylinder configured to form a combustion chamber thereinside;
- an outer cylinder configured to cover the inner cylinder and form, between the outer cylinder and the inner cylinder, an annular outer peripheral flow path through which the compressed air flows;
- an end cover configured to close an end of the outer cylinder a side opposite the turbine; and
- a turn guide provided at an end of the inner cylinder, on an end cover side of the inner cylinder, an interference surface of the turn guide protruding from an outer peripheral surface of the inner cylinder toward the outer cylinder and connected to an inner peripheral surface of the inner cylinder by a curved surface of the turn guide, wherein
- the outer peripheral surface extends substantially axially along a longitudinal axis of the inner cylinder, the interference surface extends substantially radially relative to the longitudinal axis of the inner cylinder, and
- a plurality of cooling air holes are provided in the inner cylinder along the interference surface of the turn guide, the plurality of cooling air holes being defined in part by the inner cylinder and in part by the interference surface.

3. The gas turbine combustor according to claim 2, further comprising:
- an air hole plate that is inserted into the inner cylinder from the end cover side and that has a plurality of air holes configured to guide the compressed air that has passed through the outer peripheral flow path, and which has been dammed by the end cover into the combustion chamber; and
- a plurality of fuel nozzles disposed on the end cover side with respect to the air hole plate so as to each inject the fuel into the combustion chamber through each associated air hole among the plurality of air holes.

4. The gas turbine combustor according to claim 3, further comprising:
- a spring seal provided between the air hole plate and the inner cylinder, wherein the plurality of cooling air holes are located at a first position between a portion of the spring seal which contacts the inner cylinder and a turbine side of the inner cylinder.

5. The gas turbine combustor according to claim 4, wherein a part of the turn guide is located at the first position.

6. The gas turbine combustor according to claim 2, further comprising:
- a turn vane disposed between the turn guide and the end cover.

7. The gas turbine combustor according to claim 2, further comprising:
- a plurality of straightening guides arranged side by side in a circumferential direction on the outer peripheral surface of the inner cylinder.

8. The gas turbine combustor according to claim 2, wherein
- a distance from the outer peripheral surface of the inner cylinder to an outer peripheral surface of the turn guide varies.

9. A gas turbine comprising:
- a compressor air and the compressed air;
- the gas turbine combustor according to claim 2, the combustor being configured to mix fuel with the compressed air guided from the compressor and being configured to burn the fuel mixed with the compressed air to generate a combustion gas; and
- a turbine configured to be driven by the combustion gas generated by the gas turbine combustor.

* * * * *